US006256410B1

United States Patent
Nathan et al.

(10) Patent No.: US 6,256,410 B1
(45) Date of Patent: Jul. 3, 2001

(54) METHODS AND APPARATUS FOR CUSTOMIZING HANDWRITING MODELS TO INDIVIDUAL WRITERS

(75) Inventors: Krishna S. Nathan, New York; Michael P. Perrone, Yorktown; Jayashree Subrahmonia, White Plains, all of NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/126,251

(22) Filed: Jul. 30, 1998

(51) Int. Cl.⁷ .............................. G06K 9/00; G06K 9/18; G06K 9/62
(52) U.S. Cl. .................... 382/187; 382/159; 382/181; 382/185; 382/186
(58) Field of Search ................................... 382/186, 187, 382/181, 185, 189, 159; 704/255

(56) References Cited

U.S. PATENT DOCUMENTS

| | | | |
|---|---|---|---|
| 5,434,929 | 7/1995 | Beernink et al. ..................... | 382/187 |
| 5,544,257 | * 8/1996 | Bellegarda et al. ................. | 382/187 |
| 5,559,925 | 9/1996 | Austin ................................... | 704/231 |
| 5,577,135 | * 11/1996 | Grajski et al. ....................... | 382/187 |
| 5,617,486 | 4/1997 | Chow et al. ......................... | 382/181 |
| 5,644,652 | * 7/1997 | Bellegarda et al. ................. | 382/187 |
| 5,666,438 | * 9/1997 | Beernink et al. .................... | 382/187 |
| 5,675,665 | 10/1997 | Lyon ..................................... | 382/229 |
| 5,680,480 | 10/1997 | Beernink et al. .................... | 382/187 |
| 5,680,510 | 10/1997 | Hon et al. ............................ | 704/255 |
| 5,710,831 | 1/1998 | Beernink et al. .................... | 382/189 |
| 5,710,832 | * 1/1998 | Berman et al. ...................... | 382/187 |
| 5,737,490 | 4/1998 | Austin et al. ........................ | 704/246 |
| 5,757,964 | 5/1998 | Lee et al. ............................. | 382/229 |
| 5,761,687 | 6/1998 | Hon et al. ............................ | 707/531 |
| 5,768,422 | 6/1998 | Yaeger ................................. | 382/228 |
| 5,796,863 | 8/1998 | Lyon ..................................... | 382/157 |
| 5,805,730 | 9/1998 | Yaeger et al. ....................... | 382/228 |
| 5,805,731 | 9/1998 | Yaeger et al. ....................... | 382/228 |
| 5,828,999 | 10/1998 | Bellegarda et al. ................ | 704/240 |
| 5,852,801 | 12/1998 | Hon et al. ............................ | 704/244 |
| 5,881,169 | * 3/1999 | Henry, Jr. ............................ | 382/187 |
| 5,903,884 | 5/1999 | Lyon et al. .......................... | 706/25 |
| 5,946,410 | 8/1999 | Lyon ..................................... | 382/157 |
| 6,052,481 | 4/2000 | Grajski et al. ...................... | 382/187 |

OTHER PUBLICATIONS

Nadler, et al. "Pattern Recognition Engineering", 219–220, 1993.*

Nathan, et al. "Parameter Typing in Writer–Dependent Recognition of On–Line Handwriting", IEEE, 1996.*

Nathan, et al. "On–Line Handwriting Recognition Using Continuous Parameter Hidden Markov Models", IEEE, pp. 121–124, 1993.*

* cited by examiner

Primary Examiner—Leo Boudreau
Assistant Examiner—Daniel G. Mariam
(74) Attorney, Agent, or Firm—F. Chau & Associates, LLP

(57) ABSTRACT

A method of training a writer dependent handwriting recognition system with handwriting samples of a specific writer comprises the steps of: capturing the handwriting samples of the specific writer; segmenting the handwriting samples of the specific writer; initializing handwriting models associated with the specific writer from the segmented handwriting samples; and refining the initialized handwriting models associated with the specific writer to generate writer dependent handwriting models for use by the writer dependent handwriting recognition system. Preferably, the method also comprises the step of repeating the refining step until the writer dependent handwriting models yield recognition results substantially satisfying a predetermined accuracy threshold.

32 Claims, 2 Drawing Sheets

METHODS AND APPARATUS FOR CUSTOMIZING HANDWRITING MODELS TO INDIVIDUAL WRITERS

BACKGROUND OF THE INVENTION

The present invention relates to machine translation of handwritten information and, more particularly, to methods and apparatus for customizing handwriting models to individual writers to improve the accuracy of translation.

With the rise in the popularity of hand-held, pen-based computers, the need for accurate machine translation of handwritten text into machine printed text has increased. However, due to the wide variety of handwriting styles, many of which have ambiguous and/or conflicting character representations, generic machine translation with high fidelity is a very difficult task. To reduce this problem, methods have been developed to attempt to enable machine translation devices to adapt to individual writers' styles. These methods can be divided into those which require the collection of samples of a writers' handwriting and those which do not. Typically, the methods which require samples of a writers' handwriting are preferable due to their superior translation performance. However, none of the conventional handwriting translation systems have been able to provide customization which provides consistently accurate and significantly improved translation results.

SUMMARY OF THE INVENTION

The present invention provides methods apparatus for adapting a writer independent system to a user from samples of the user's writing to form a writer dependent recognition system. The writer independent system is trained using handwriting samples collected from a pool of writers. A machine translation system of a users' handwriting utilizing samples from a pool of writers is usually not as accurate as is a system trained on only the users' handwriting due to the fact that the variability in writing style is greater in a pool of writers as compared to that from a single writer. Accordingly, the present invention provides methods and apparatus for customizing handwriting models to individual users by training a writer dependent handwriting recognition system with a specific writers' handwriting samples such that the accuracy of realtime recognition is significantly increased when that particular writer uses the system.

In one aspect of the invention, a method of training a writer dependent handwriting recognition system with handwriting samples of a specific writer comprises the steps of: capturing the handwriting samples of the specific writer; segmenting the handwriting samples of the specific writer; initializing handwriting models associated with the specific writer from the segmented handwriting samples; and refining the initialized handwriting models associated with the specific writer to generate writer dependent handwriting models for use by the writer dependent handwriting recognition system. Preferably, the method also comprises the step of repeating the refining step until the writer dependent handwriting models yield recognition results substantially satisfying a predetermined accuracy threshold.

These and other objects, features and advantages of the present invention will become apparent from the following detailed description of illustrative embodiments thereof, which is to be read in connection with the accompanying drawings in which the same reference numerals are used throughout the various figures to designate same or similar components.

DETAILED DESCRIPTION OF PREFERRED EMBODIMENTS

Figure 1:
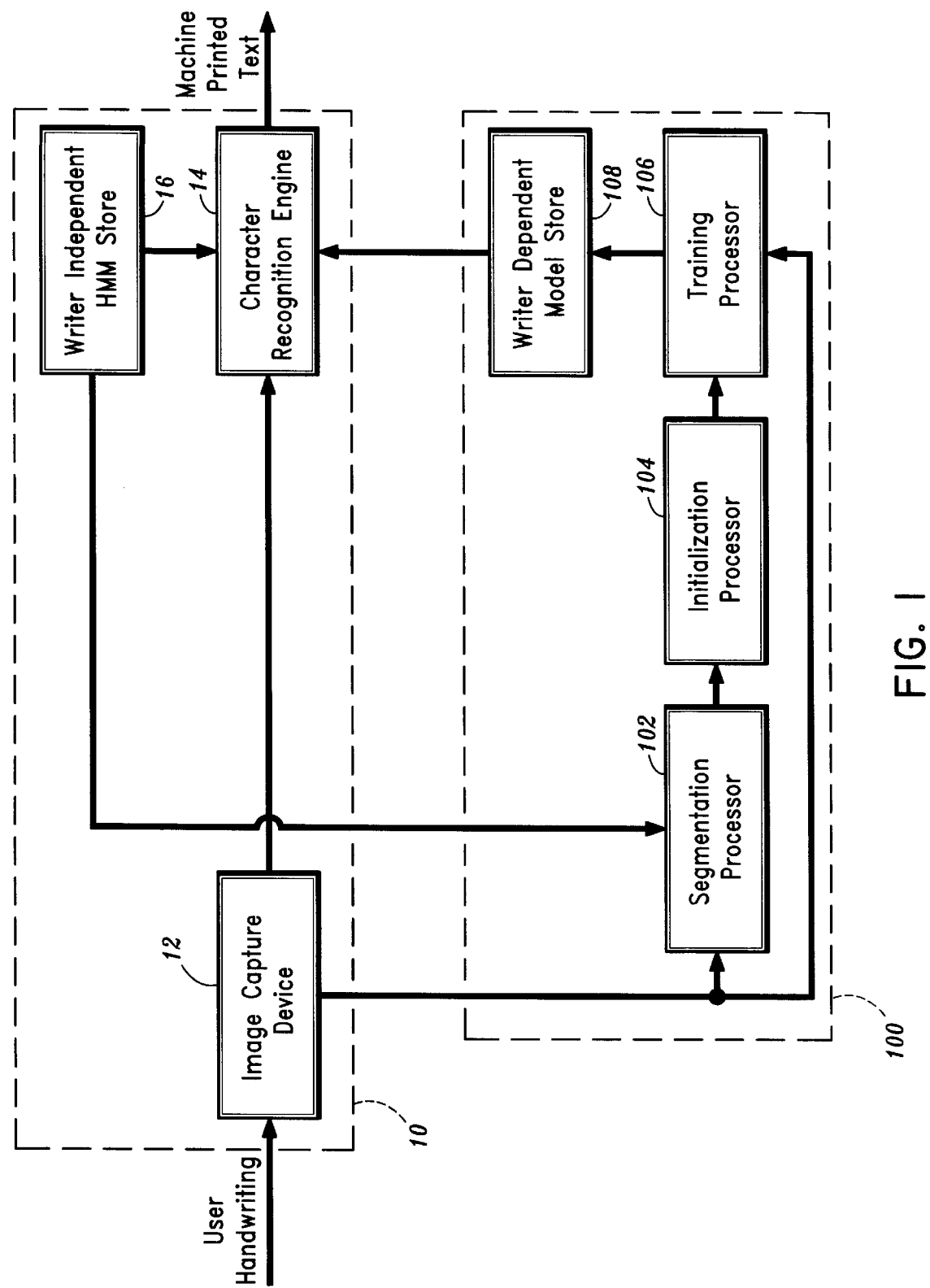
FIG. 1 is a block diagram of writer dependent training apparatus according to an embodiment of the present invention in conjunction with a handwriting recognition system.

Referring to FIG. 1, a block diagram of writer dependent training apparatus 100, according to one embodiment of the present invention is shown in connection with a writer independent handwriting recognition system 10. It is to be understood that the writer independent handwriting recognition system 10 is a conventional system and, in conjunction with the writer dependent training apparatus of the present invention, the system 10 operates as a writer dependent handwriting recognition system. Therefore, the writer dependent system includes the image capture device 12, the character recognition engine 14 and the writer dependent model store 108. The system 10 preferably includes an image capture device 12 for capturing handwriting samples of a particular writer. The device 12 may be any conventional image capturing device such as, for example, a digitizer tablet, an image scanner, etc. In the case of the digitizer tablet, the user writes directly on the tablet and the handwriting sample is captured and then stored. In the case of the scanner, the users' handwriting sample is previously written on a separate piece of paper and the sample is captured from the paper and then stored.

The image capture device 12 is operatively coupled to a character recognition engine 14. It is known that the character recognition engine 14 receives the captured handwriting samples and attempts to identify characters and, thus, words formed by the characters, that the writer intended in order to produce machine printed text representative thereof.

The recognition process is accomplished in conjunction with previously created handwriting models. A writer independent system includes handwriting models for all the characters in the pre-specified character set. These models, trained from handwriting samples of a large pool of writers, capture information on how people write different characters on an average. These models are used by the recognition engine 14 to convert any writers' handwriting into machine printed text. In a handwriting recognition system, such as the system 10, a character set may consist of 93 characters (lower and upper case English alphabet characters, digits and all symbols). This number of characters may vary (more or less) for other languages. The writer independent system 10 includes multiple Hidden Markov Models (HMMs) for each character.

The HMMs are stored in memory store 16, which is operatively coupled to the character recognition engine 14. Each HMM models one shape of a character. Since each character can be written in multiple ways, multiple HMMs are used to model the shape of a character. However, due to the large variations in writing that these models may be generated from, they are usually not as accurate as models trained from writing for only one writer.

Accordingly, an embodiment of the present invention provides writer dependent training apparatus 100, as shown in FIG. 1, to substantially improve recognition accuracy of a writer independent handwriting recognition system, such as for example, writer independent system 10. As a result, after the system 10 is trained via apparatus 100, the system may operate as a writer dependent system. Apparatus 100 includes a segmentation processor 102, an initialization processor 104 operatively coupled to the segmentation processor 102, and a training processor 106 operatively coupled to the initialization processor 104. The apparatus 100 also includes a writer dependent model store 108 operatively coupled to the training processor 106 and to the character recognition engine 14 of the system 10. Further, the segmentation processor 102 and the training processor 106 are also operatively coupled to the image capture device 12 of the system 10. Still further, the segmentation processor 102 is operatively coupled to the writer independent HMM store 16 of the system 10.

It is to be appreciated that the processing elements illustrated in FIG. 1 may be implemented in various forms of hardware, software, or combinations thereof. The character recognition engine 14, the segmentation processor 102, the initialization processor 104 and the training processor 106 are implemented in software on one or more appropriately programmed general purpose digital computers. Each general purpose digital computer may contain, for example, a central processing unit (CPU) operatively coupled to associated system memory, such as RAM, ROM and a mass storage device, via a computer interface bus. Accordingly, the software modules performing the functions described herein may be stored in ROM or mass storage and then loaded into RAM and executed by the CPU. As a result, FIG. 1 may be considered to include a suitable and preferred processor architecture for practicing the invention which may be achieved by programming the one or more general purpose processors. Of course, special purpose processors may be employed to implement the invention. The character recognition engine 14 and the various functional processors may, therefore, be considered functional blocks illustrating the computer facility or facilities executing their respective functions. Memory stores 16 and 108 are also preferably part of the computer facility or facilities implementing the functions of the various functional processors. Further, the image capture device 12 is preferably an input device coupled to the same computer facility or facilities. Also, although not shown, the output of the character recognition engine 14, i.e., the machine printed text, may be provided to an output device of the same computer facility or facilities, e.g., a CRT display or a printer. It should also be understood that the writer independent handwriting recognition system 10 and the writer dependent training apparatus 100 may be implemented on the same or separate digital computers. Given the teachings of the invention provided herein, one of ordinary skill in the related art will be able to contemplate these and similar implementations of the functional elements of the invention.

It is to be further appreciated that while the writer dependent training apparatus 100 of the invention preferably utilizes the image capture device 12 of the writer independent system 10, the training apparatus 100 may include its own similar image capture device.

Figure 2:
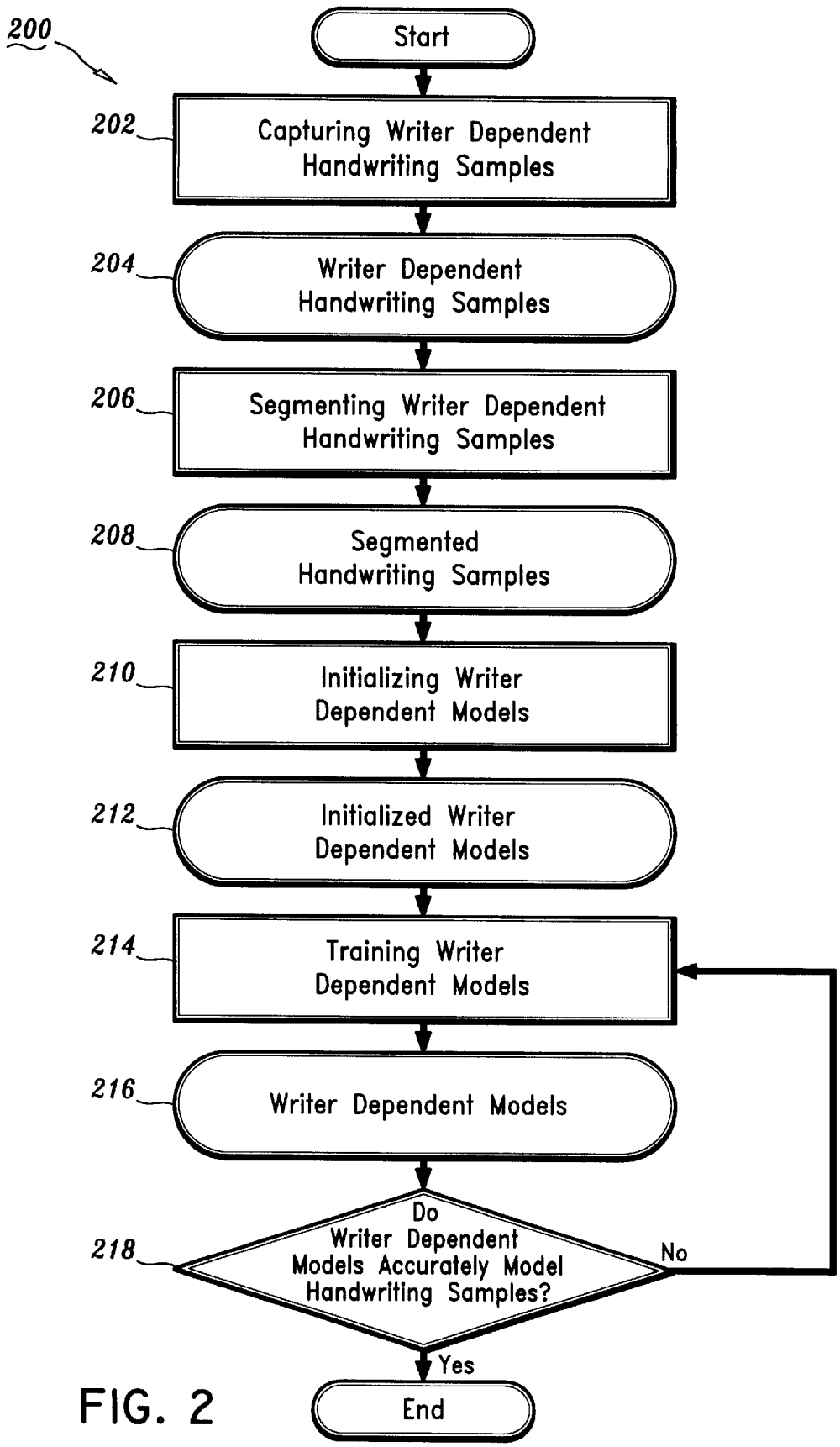
FIG. 2 is a flow chart of a writer dependent training method according to an embodiment of the present invention.

Referring now to FIG. 2, an embodiment according to the present invention of a writer dependent training method 200, to be performed in conjunction with the system 10 and apparatus 100 shown in FIG. 1, will now follow.

Writer dependent handwriting samples consist of writing samples for one writer. Thus, in step 202, a particular writer provides such writing samples 204 which are preferably captured by the image capture device 12, or an image capture device of the apparatus 100. It is to be appreciated that the particular writer for whom the writer dependent models are to be generated, according to the invention, is the writer whose handwriting is to be translated during real-time recognition. This is to be distinguished from the pool of writers who provide writing samples in the writer independent system from which models based on pool averages are generated for use in real-time to translate handwriting provided by any person.

Preferably, the user is prompted to write a set of pre-specified sentences or words. The writer copies the set in his or her natural writing style, making sure that the casing of different letters is maintained, except in cases where the user always writes in upper-case, in which case the user is specifically prompted to copy the sentences in upper case ignoring the casing of the prompted text.

Next, in step 206, the writer dependent training method 200 includes segmenting the writer dependent handwriting samples 204 captured in the previous step. Segmentation is preferably performed by the segmentation processor 102. A good initial estimate of the writer dependent models helps increase the accuracy of the fully trained models and helps reduce the training time considerably. Examples of how a writer writes each character are used to obtain a good initial estimate. One approach to get this information is to prompt the writer to write characters in isolation. This, however, does not capture a writer's natural writing style and does not capture information on how a writer writes a character in the context of other characters. A preferred approach to get information on the shapes of individual characters is to segment each word into its constituent characters. Segmentation includes computing the best estimate of the boundaries between the characters in a handwritten word. This process is simpler for a writer who prints (i.e., lifts the pen up between characters) compared to that for a writer who does not. Segmentation can be computed by using prior information on the shapes of the characters. The writer independent models (store 16) provide this information and are used to initially compute the segmentation (segmentation processor 102). A preferred segmentation is computed using a dynamic programming approach using the writer's handwriting samples (provided from the image capture device 12) and the writer independent HMMs (provided from store 16) for the characters. It is to be appreciated that dynamic programming is an efficient way of computing the best segmentation of a word into its constituent characters. This approach computes the scores for all segmentations of the word using the writer independent HMMs. By computing scores of only those portions of a new segmentation that are different compared to the segmentations already explored, the approach can efficiently look at the space of all possible segmentations. The dynamic programming technique then considers the true segmentation to be the segmentation yielding the highest score.

Next, segmentation results 208 are used, in step 210, to initialize the writer dependent models. This step is preferably performed by the initialization processor 104. Initialization of the models involves computing a good initial estimate of the parameters of the writer dependent models. In the case of HMMs, examples of parameters to be initialized are means and covariances of the gaussians used to model a character, the probabilities of portions of a character being close to each gaussian, and the length of the model for each character. The value of these parameters are composed from the training examples as the values that yield the highest score for the training examples. In many cases, the writer dependent models are built in a hierarchical manner with each character being modeled by a set of models, each differing in complexity compared to the other. One main reason to do this is to use the less complex models in stages of machine translation that are computationally intensive. This helps speed up the translation process. In such cases, all the models are initialized using the segmented outputs. Preferably, each character is modeled by two models. The first model has a single state that models the shape of the entire character while the second model consists of a sequence of states with each state modeling a respective portion of the character. The number of states for the second model and all the parameters of the states are initialized using the segmented words.

Next, after the writer dependent models are initialized, the writer's handwriting samples (from the image capture device 12) are reused, in step 214, to train the initialized writer dependent models 212. Preferably, this step is performed by the training processor 106. Training involves refining the initial parameters to better model the handwriting samples. Refinement of the parameters is accomplished by preferably iterating, back and forth, between two stages until the models satisfactorily model the characters: (1) using the best estimate of the parameters, a segmentation of the words into characters is computed, using the dynamic programming approach; and (2) the segmented output is then used to get a better estimate of the parameters and, hence, better character models. It is to be understood that the segmenting procedure performed during the refining process is similar to the initial segmenting procedure performed in step 206 (by the segmentation processor 102); however, while step 206 utilizes the writer independent HMMs (from store 16) to determine how the data captured by the image capture device is to be segmented, the refining step 214 utilizes the initialized writer dependent models to better segment the captured data received from the image capture device. Thus, by preferably performing refinement in an iterative manner, the models are better trained each time because the best writer dependent models from the previous iteration are used to perform the next refinement iteration. The result of the training step 214 is the writer dependent handwriting models 216.

In step 218, measures of how well the models model the handwriting samples are used to estimate when the training process can be terminated. There are a number of measures to determine when the training process can be terminated. By way of example, cross validation is one method. In cross validation, training is terminated when the recognition accuracy on both the training example and a separate held-out test set stop improving. Another method may include terminating training iterations when the difference in models between two training iterations is small. Either of these measures may be performed until some predetermined accuracy threshold, set in the training processor 106, is reached. One of ordinary skill in the art will appreciate other applicable measures. It is to be appreciated that, in many cases, one pass of training results in models that model the handwriting samples well. However, as mentioned above, in some cases, it is helpful to rerun step 214 using the trained writer dependent models 216 from the previous training pass to compute the segmentation in a next pass. Using the trained models from one pass gives better segmentation results which in turn results in better estimates of the model parameters. Accordingly, if it is determined, by the training processor 106, that the writer dependent models generated in a first training pass do not adequately model the particular writers' handwriting, then the training method 200 returns to step 214, which is repeated, else, the training method 200 is terminated.

Accordingly, the trained writer dependent models 216 are stored in writer dependent model store 108 and used by the character recognition engine 14 in order to translate real-time handwriting provided by the particular writer for whom the writer dependent models were trained according to the invention. Advantageously, the handwriting recognition accuracy of system 10 is significantly increased and more consistent given the use of the writer dependent models formed in accordance with the present invention.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of training a writer dependent handwriting recognition system with handwriting samples of a specific writer, the method comprising the steps of:

(a) capturing the handwriting samples of the specific writer;

(b) segmenting the handwriting samples of the specific writer;

(c) initializing handwriting models associated with the specific writer from the segmented handwriting samples, the initialized handwriting models comprising more than one hidden markov model for each character; and (d) refining the initialized handwriting models associated with the specific writer to generate writer dependent handwriting models for use by the writer dependent handwriting recognition system.

2. The method of claim 1, further comprising repeating the refining step until the writer dependent handwriting models yield recognition results substantially satisfying a predetermined accuracy threshold.

3. The method of claim 1, wherein the segmenting step is performed using a dynamic programming approach.

4. The method of claim 1, wherein the segmenting step utilizes prior information on shapes of characters which are used in the handwriting samples.

5. The method of claim 1, wherein the segmenting step utilizes writer independent Hidden Markov Models.

6. The method of claim 1, wherein the initialized handwriting models include a first model having a single state that models the shape of an entire character.

7. The method of claim 6, wherein the initialized handwriting models include a second model having a sequence of states with each state modeling a respective portion of the character.

8. The method of claim 6, wherein the initialized handwriting models include a second model having a sequence of states with each state modeling a respective portion of the character.

9. The method of claim 6, wherein the initialized handwriting models include a second model having a sequence of states with each state modeling a respective portion of the character.

10. The method of claim 1, wherein the refining step includes a segmenting step utilizing the initialized handwriting models.

11. The method of claim 10, wherein the segmenting step performed during the refining step utilizes a dynamic programming approach.

12. The method of claim 1, wherein the refining step is repeated and the writer dependent handwriting models from a previous iteration are used in a segmenting step performed in a next iteration.

13. The method of claim 1, wherein the initialized handwriting models include a first model having a single state that models the shape of an entire character.

14. The method of claim 1, wherein the initialized handwriting models include a first model having a single state that models the shape of an entire character.

15. The method according to claim 1, wherein said initializing step comprises the step of building the handwriting models in a hierarchical manner, with each of the characters being modeled by a set of handwriting models, each of the handwriting models in the set differing in complexity.

16. The method according to claim 15, wherein less complex handwriting models in the set are employed in stages of machine translation that are computationally intensive.

17. Computer-based apparatus for training a writer dependent handwriting recognition system with handwriting samples of a specific writer, the apparatus comprising:

means for capturing the handwriting samples of the specific writer;

means for segmenting the handwriting samples of the specific writer;

means for initializing handwriting models associated with the specific writer from the segmented handwriting samples, the initialized handwriting models comprising more than one hidden markov model for each character; and means for refining the initialized handwriting models associated with the specific writer to generate writer dependent handwriting models for use by the writer dependent handwriting recognition system.

18. The apparatus of claim 17, further comprising means for repeating the refining step until the writer dependent handwriting models yield recognition results substantially satisfying a predetermined accuracy threshold.

19. The apparatus of claim 17, wherein the segmenting means uses a dynamic programming approach.

20. The apparatus of claim 17, wherein the segmenting means utilizes prior information on shapes of characters which are used in the handwriting samples.

21. The apparatus of claim 17, wherein the segmenting means utilizes writer independent Hidden Markov Models.

22. The apparatus of claim 17, wherein the refining means includes segmenting means which utilizes the initialized handwriting models.

23. The apparatus of claim 22, wherein the segmenting means of the refining means utilizes a dynamic programming approach.

24. The apparatus of claim 17, wherein the refining means utilizes the writer dependent handwriting models from a previous iteration for segmenting performed in a next iteration.

25. Computer-based apparatus for training a writer dependent handwriting recognition system with handwriting samples of a specific writer, the writer dependent handwriting recognition system including an image capture device for capturing the handwriting samples of the specific writer, the apparatus comprising:

a segmentation processor for segmenting the handwriting samples of the specific writer;

an initialization processor for initializing handwriting models associated with the specific writer from the segmented handwriting samples, the initialized handwriting models comprising more than one hidden markov model for each character; and a training processor for refining the initialized handwriting models associated with the specific writer to generate writer dependent handwriting models for use by the writer dependent handwriting recognition system.

26. The apparatus of claim 25, further comprising means for repeating the refining step until the writer dependent handwriting models yield recognition results substantially satisfying a predetermined accuracy threshold.

27. The apparatus of claim 25, wherein the segmentation processor uses a dynamic programming approach.

28. The apparatus of claim 25, wherein the segmentation processor utilizes prior information on shapes of characters which are used in the handwriting samples.

29. The apparatus of claim 25, wherein the segmentation processor utilizes writer independent Hidden Markov Models.

30. The apparatus of claim 25, wherein the training processor performs a segmenting step utilizing the initialized handwriting models.

31. The apparatus of claim 30, wherein the segmenting step performed by the training processor utilizes a dynamic programming approach.

32. The apparatus of claim 25, wherein the training processor utilizes the writer dependent handwriting models from a previous iteration in a segmenting step performed in a next iteration.

\* \* \* \* \*